(12) United States Patent
Messano

(10) Patent No.: US 7,338,335 B1
(45) Date of Patent: Mar. 4, 2008

(54) HYBRID ELECTRIC HEAVY-DUTY VEHICLE DRIVE SYSTEM

(76) Inventor: Frank Messano, 2100 Heyneman La., Simi Valley, CA (US) 93065

( * ) Notice: Subject to any disclaimer, the term of this patent is extended or adjusted under 35 U.S.C. 154(b) by 289 days.

(21) Appl. No.: 11/031,263

(22) Filed: Jan. 6, 2005

Related U.S. Application Data

(63) Continuation-in-part of application No. 10/712,227, filed on Nov. 14, 2003, now Pat. No. 6,840,825, which is a continuation-in-part of application No. 10/177,314, filed on Jun. 24, 2002, now Pat. No. 6,679,543, which is a continuation-in-part of application No. 09/766,966, filed on Jan. 23, 2001, now Pat. No. 6,425,625.

(51) Int. Cl.
*B60F 3/00* (2006.01)
*B60K 1/01* (2006.01)

(52) U.S. Cl. .................. 440/12.5; 180/65.4; 180/65.5; 180/65.8

(58) Field of Classification Search ............... None
See application file for complete search history.

(56) References Cited

U.S. PATENT DOCUMENTS

| | | | |
|---|---|---|---|
| 4,099,589 A | 7/1978 | Williams | |
| 4,181,188 A * | 1/1980 | Dessert | 180/2.2 |
| 4,392,393 A | 7/1983 | Montgomery | |
| 4,634,142 A * | 1/1987 | Woods et al. | 280/5.503 |
| 5,398,508 A | 3/1995 | Brown | |
| 5,492,189 A | 2/1996 | Kriegler | |
| 5,495,912 A | 3/1996 | Gray | |
| 5,847,520 A * | 12/1998 | Theurillat et al. | 318/139 |
| 5,908,077 A | 6/1999 | Moore | |
| 6,059,059 A | 5/2000 | Schmidt-Brucken | |
| 6,102,419 A | 8/2000 | Chun | |
| 6,394,209 B1 * | 5/2002 | Goehring et al. | 180/65.4 |
| 6,527,078 B1 | 3/2003 | Nelson | |
| 6,722,458 B2 | 4/2004 | Hofbauer | |
| 2002/0153745 A1 | 10/2002 | Messano | |
| 2002/0175009 A1 * | 11/2002 | Kress | 180/65.2 |
| 2003/0029651 A1 * | 2/2003 | Palmeri | 180/65.1 |
| 2003/0104899 A1 * | 6/2003 | Keller | 477/2 |

OTHER PUBLICATIONS

U.S. Appl. No. 10/922,479, filed Aug. 20, 2004, Messano.
U.S. Appl. No. 10/712,227, filed Nov. 14, 2003, Messano.

* cited by examiner

*Primary Examiner*—Sherman Basinger

(57) ABSTRACT

A hybrid electric system designed to lower fuel consumption in heavy-duty long-haul vehicles, and in medium and light duty vehicles (trucks, buses, vans, SUVs, recreational vehicles, and the like), utilizing a multiplicity of thermal engines, regenerative power road-wheels, solar cells, and frontal area reducing adjustable-height suspension that are utilized singly or in combinations as suits the vehicle's mission.

9 Claims, 12 Drawing Sheets

HYBRID ELECTRIC HEAVY-DUTY VEHICLE DRIVE SYSTEM

CROSS-REFERENCE TO RELATED APPLICATIONS

This Hybrid Electric Heavy-Duty Vehicle Drive System patent application is a Continuation-In-Part of my patent application Ser. No. 10/712,227, filed Nov. 14, 2003, titled "Amphibious Recreational Vehicle" and now U.S. Pat. No. 6,840,825, and which is a Continuation-In-Part of application Ser. No. 10/177,314, filed Jun. 24, 2002, titled "Comprehensive Vehicle Construction And Hybrid Electric Drive System" and now U.S. Pat. No. 6,679,543, and which is a Continuation-In-Part of my patent application Ser. No. 09/766,966, filed Jan. 23, 2001, titled "Rooftop Deck Systems For Vehicles", and now U.S. Pat. No. 6,425,625.

Application Ser. No. 10/177,314 is also a Continuation-In-Part of application Ser. No. 10/142,403, filed May 10, 2002, titled "Seating, Handrails & Canopy For Rooftop Deck Vehicles" and now abandoned, and which relates to my previous patent application Ser. No. 09/491,764, filed Jan. 27, 2000, titled "Streamline Rooftop Deck For Motorhomes" and now U.S. Pat. No. 6,237,988.

Lastly, this application is related to my patent application Ser. No. 10/922,479, filed Aug. 20, 2004, titled "Thin-Skin Ultralight Recreational Vehicle Body System", now U.S. Pat. No. 7,000,978.

BACKGROUND OF THE INVENTION

1. Field of the Invention

The present invention relates generally to a heavy-duty vehicle hybrid drive and suspension system and, more particularly, to a fuel efficient heavy-duty Class 8 long-haul vehicle in which a number of small highly efficient constant speed diesel engine-generators are variously used at any one time to meet the varying speed and load demands of the vehicle; and with road-wheels driven by modular electrical motor suspension units which can be utilized in any location on the vehicle chassis and on trailers of the vehicle. The drive system equally applies to light & medium duty Class 2 to 7 vehicles, motorhomes, amphibians, and automobiles.

2. Description of the Prior Art

Hybrid vehicle drive systems employing an internal combustion engine and electric motors to drive the wheels are well known in the art.

Known prior hybrid vehicle art includes U.S. Pat. Nos. 4,099,589; 5,327,987; 5,495,906; 5,842,534; 5,908,077; 5,979,257; 5,993,350; 6,059,059; 6,817,432; 6,823,954; and 6,832,148.

While these devices fulfill their respective, particular objectives and requirements, the aforementioned patents do not disclose a new hybrid system for heavy-duty Class 8 long-haul type vehicles.

These hybrid vehicle drive systems are designed for light-weight urban automobiles, light trucks, delivery vans, and intercity buses where stop and go driving is the norm. But there is a lack of hybrid systems designed to reduce fuel consumption for long-haul heavy-duty Class 8 trucks, as well as medium-duty Class 4 to 7 vehicles and motorhomes. With non-urban long haul heavy vehicles, the traditional small vehicle hybrid "stop & go" schemes of using smaller engines augmented by batteries and regenerative braking, or turning off the engine while at a stoplight, provides no benefits to a heavy weight vehicle which may stop only once every 200 or 300 miles.

With long-haul, heavy-duty vehicles on level cross-country highways, the major elements that impact fuel economy are: (1) the frontal area size of the vehicle, and (2) engine inefficiencies due to varying the speed & power of a fixed size single engine to meet various driving & load conditions. On inclines, there is the element of (3) energy wasted for downhill braking of the truck and the trailers. And in sunny areas, the potential use of free power from photovoltaic cells.

My invention focuses on increasing fuel economy of heavy-duty, long haul Class 4 to 8 vehicles by adjustably decreasing the frontal area of the vehicle in transit, eliminating the inefficient varying speed & power of a single engine, capturing regenerative braking energy from the truck and its trailers, and capturing free solar energy to lower fuel consumption in sunny climes.

In this respects, this invention of a heavy-vehicle hybrid system substantially departs from conventional concepts and designs of prior art, and in doing so provides a hybrid system specifically focused on lower fuel usage of heavy-duty, long haul Class 4 to 8 vehicles.

SUMMARY OF THE INVENTION

In view of the foregoing disadvantages inherent in the known types of hybrid systems as applied to heavy-duty, tong haul vehicles now present in the art, the present invention provides a significant reduction in fuel consumption for heavy-duty, long haul Class 4 to 8 vehicles.

The general purpose of the present invention, which will be described subsequently in greater detail, is to provide a new heavy-duty, long haul Class 4 to 8 vehicle hybrid system and method which has many of the advantages of the small vehicle hybrid systems mentioned heretofore and many novel features that result in a new fuel efficient heavy-duty vehicle hybrid system, which is not anticipated, rendered obvious, suggested or even implied by any of the prior art hybrid systems, either alone or in any combination.

To attain this, the present invention generally comprises (a) multiple fuel-efficient fixed-speed & power output thermal engines to eliminate inefficiencies of varying the power & speed of a single engine; (b) electric motor road-wheel drive modules to power the vehicle and its trailers, and to regenerate braking energy into stored energy for reuse to lower fuel consumption; and (c) ability to variably lower the height of the vehicle and its trailers for reducing the frontal area as selected by the driver; and (d) collecting solar energy from the roof areas of the vehicle and its trailers to power the vehicle-trailer system, and to store energy for reuse to lower fuel consumption of the vehicle in sunny climes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a highly fuel efficient heavy duty hybrid vehicle system for Class 4 to Class 8 trucks, motorhomes, buses, and other vehicles, which includes trucks with trailers. There are five separate but interrelated modules of this present system, which can be used singly or in any combination in a vehicle. Each module is separately summarized as follows:

A GenSet Module is the primary thermal fuel energy module (using diesel, gasoline, kerosene, LPG, etc, and other thermal fuels) consisting of multiple, small internal combustion engines that each run within a fixed speed & power RPM range that maximizes fuel efficiency, power output, and engine longevity . . . much like engines that drive stationary electrical generators. Automobiles and trucks use a single engine which greatly varies its speed (typically 500 RPM at idle to 4,000 RPM when accelerating) with a similar variance in power output. It is the varying of speed and power output that is a major element in lowering fuel economy. On the other hand, an engine optimized with a fixed speed & power output (an optimized engine) is substantially more fuel efficient than an engine used with varying speeds and power output. Coupled to each optimized engine, or combination of optimized engines is a generator or alternator (depending upon the electrical systems of the vehicle) that provides electrical energy to Battery Modules, and optionally to Motor-Driven Road-Wheel Modules of the vehicle and or its trailers. The optimized engine coupled to a generator (or alternator) is referred herein as a GenSet. A GenSet Module is a multiplicity of similar and non-similar GenSets.

The efficiency of the GenSet Module operation is based upon the vehicle using only the number of optimized engine GenSets necessary to provide power to the Battery Modules and Road-Wheel Modules as required to meet the varying power and speed demands of the vehicle. For example, only one GenSet is used when the vehicle is in the idle mode, whereby the single Genset, running at is optimized fixed range speed, provides the electrical power necessary for charging the Battery Module(s), the brakes, the power steering, the heating, the air-conditioning, and other auxiliary equipment of the vehicle. If there is sufficient Battery Module power already available, then the GenSet automatically turns itself off to conserve fuel until the Battery Module(s) require recharging. As the Battery Module(s) are also charged by the regenerative brakes in the Road-Wheel Modules and from the Photovoltaic Module(s). In sunny climes the GenSet would not be needed to run these vehicle systems nor to charge the Battery, as the solar power comes freely from the sun. When accelerating, one or more additional GenSets automatically start and provide the power necessary to meet the demands of the vehicle. Then, as the vehicle reaches cruise speed requiring less power, an appropriate number of GenSets automatically turn themselves off to conserve fuel. Reaching a downhill grade, still more GenSets turn themselves off. So at any one time, regardless of the varying speed and power requirements of the vehicle, the engines being used are running at their fixed range of optimum fuel efficiency.

And because this present invention is for an electric vehicle which does not have a conventional driveline (transmission, drive shafts, and differentials) which determines where a conventional engine lays within a vehicle, the GenSet Module(s) can be located anywhere convenient within the vehicle, and even dispersed within its trailers.

A Battery Module is the primary electrical energy storage unit. While called a "Battery Module" for simplicity, the Module may consist of batteries, capacitors, or any combination thereof where electrical energy is stored. The Battery Module(s) can be located anywhere convenient within the vehicle, and may also be dispersed within its trailers. The Battery Module receives electrical power from the GenSets, the regenerative brakes of the Road-Wheel Modules, the Photovoltaic Module(s), fuel cells, and from the power grid when so connected.

Road-Wheel Modules provide the motive system for the vehicle and vehicle trailers. A Road-Wheel Module consists of an electric drive motor (which also provides the secondary braking for slowing and stopping the vehicle when acting as generators), a separate conventional brake, and suitable suspension. The Road-Wheels are locatable on the chassis of the vehicle, preferably at all tire locations, and also locatable on trailers towed by the vehicle. The electric motors receive power from the Battery Modules and optionally from the GenSets. The speed and rotation of the motors are vehicle computer controlled.

A Photovoltaic Module(s) is the solar energy module which consists of a multiplicity of photovoltaic cells located on the rooftop surfaces of the vehicle and its trailer(s). While the roof surface of a typical automobile somewhat limits the generation of significant solar energy, the rooftop surfaces of a truck and its trailer(s) provide ample surface to generate significant electrical energy to augment the power needs of a heavy-duty vehicle, thus reducing its fuel consumption. Moreover, the Photovoltaic Module(s) can provide power for refrigerated trailers when parked, further reducing fuel usage. Moreover, parked and stored Photovoltaic Module equipped trailers can be connected to a power grid to sell electrical power and generate additional income for its owner(s).

A Variable-Height Suspension Module consists of airbag springs, or hydraulic or mechanical suspension height adjusters, that are height controllable by the vehicle driver. In operation on intercity streets and driveways, the vehicle runs at its normal height . . . which normally provides about four feet of clearance between the road surface and the bottom of the chassis for conventional trailers. When on highways, the driver within the cab lowers the trailer(s), and optionally the tow vehicle, closer to the highway surface, which reduces that overall height of the vehicle-trailer combination and its frontal area. Since the size of the frontal area significantly impacts the amount of fuel consumed on flat highways, reducing the frontal area of the vehicle system similarly reduces the fuel consumption of the vehicle. To accommodate the variable height suspension, the present invention utilizes newly introduced reduced-diameter wide-tread single tires that replace traditional dual tires on heavy-duty Class 8 vehicles and trailers, which are optionally coupled with recessed tire wells in the trailer chassis.

While it is not necessary to use all modules to be within the scope of the present invention, an example of all modules in operation for a Class 8 long-haul truck consisting of an electric drive tractor-truck, a semi-trailer, and a refrigerated semi-trailer follows:

The tractor-truck comprises an electric drive chassis, a sleeper cab, a diesel fueled GenSet Module, a Battery Module, a Variable-Height Suspension Module, and a Photovoltaic Module on the sleeper cab roof. Each semi-trailer comprises a box trailer, a Battery Module, a Photovoltaic Module, and a Variable-Height Suspension Module. The refrigerated semi-trailer also has a GenSet Module.

When the vehicle is parked with all engines off (Mode 1), the Photovoltaic Modules convert available solar energy and charge the Battery Modules of the tractor-truck and the trailers. A controller directs the collected electrical energy to any of the Battery Modules that require a charge. And if the semi-trailer's refrigeration system is running, it draws its power from the Battery Modules. When any of the Battery Modules require a charge, a GenSet automatically starts and charges the appropriate Battery Module(s).

When driving the vehicle at slow speeds (Mode 2), the Battery Modules and, during sunlight, the Photovoltaic Modules from the tractor-truck and from the trailers provide power to all vehicle systems and also provides power to the Road-Wheel Modules until the Battery Modules require charging. When the Battery Modules require charging, one or more GenSets automatically start and charge the batteries, and also direct current to the Road-Wheel motors as required to meet the speed and load demands of the vehicle.

When accelerating or climbing grades (Mode 3), additional GenSets automatically start and provide power as required to meet the speed and load demands of the vehicle. Where trailers optionally comprise Road-Wheel Modules with regenerative braking, power from the GenSet Modules anywhere in the system as well from the Battery Modules anywhere in the system may supply power to all or any wheels. As the vehicle speed or hill grade decreases, requiring less power, one or more GenSet Modules are automatically turned off . . . so that only the number of GenSets required to provide power as demanded by the vehicle system are running at any one time.

When cruising speed is reached (Mode 4), the GenSet Modules no longer necessary for providing adequate power to the vehicle system are automatically turned off. The Photovoltaic Modules convert available daylight to augment power to the vehicle system, thus reducing the fuel consumption of the vehicle. When activated by the driver, the Variable-Height Suspension Modules lower the overall height of the vehicle to reduce the frontal area by 15%, which further lowers the fuel consumption of the vehicle.

When running down grade or stopping (Mode 4), the Road-Wheel Modules provide the braking normally supplied on a conventional Class 6 vehicle by the engine compression, the diesel engine exhaust brake, and air brakes at each wheel set. In this Mode, the Road-Wheel Modules, acting as generators, charge the Battery Modules, which further reduces fuel consumption.

Non-tractor single vehicles (such as tanker trucks, buses, motor coaches, motorhomes, box van trucks, refrigerated box trucks, and the like) are similarly operated, depending upon the Modules incorporated within their system. For example, a diesel motorhome may be comprised of GenSet Modules located at the front and back of the vehicle, multiple Road-Wheel Modules, Battery Modules under the center of the vehicle, Photovoltaic Modules on the roof, and Variable-Height Suspension Modules that lower the vehicle on the road, and raise it when parked with the slideouts extended. Another example is a tanker truck that may only have GenSet Modules, Battery Modules, and Road-Wheel Modules. And, in smaller size vehicles like pickup trucks, SUVs, delivery vans, and automobiles, the GenSet, Battery, and Road-Wheel Modules will meet their power and speed requirements.

While the present invention has many of the advantages of the hybrid patents mentioned heretofore in the Prior Art, it has many novel features that result in a fuel efficient heavy-duty system for vehicles and their trailers which is not anticipated, rendered obvious, suggested, or even implied by any of the prior art hybrid systems, either alone or in any combination thereof.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive manner in which there are illustrated preferred embodiments of the invention.

BRIEF DESCRIPTION OF THE DRAWINGS

Other features and advantages of the present invention will be apparent from the following detailed descriptions of preferred embodiments thereof when read in conjunction with reference to the accompanying drawings, wherein.

DESCRIPTION OF THE PREFERRED EMBODIMENT

Figure 1:
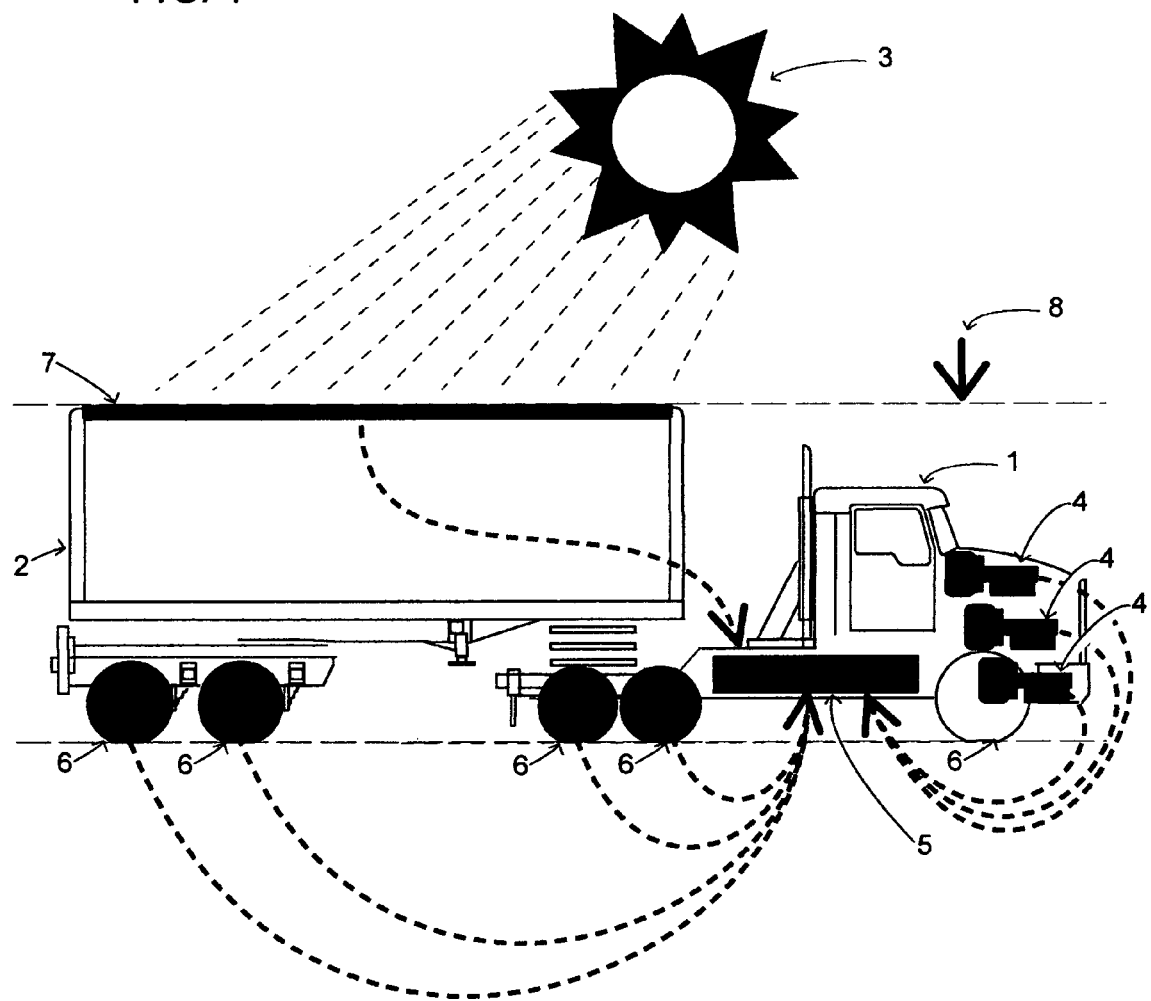
FIG. 1 shows a schematic side view of an electric-drive tractor truck and a semi-trailer with the sun above.

FIG. 1 is a diagram showing the elements which lower fuel consumption of a vehicle exemplified in one embodiment of the present invention. Shown is a schematic side view of an electric-drive tractor truck 1 and a semi-trailer 2 with the sun 3 above which exemplifies one embodiment of the present invention. Three GenSets 4 and a Battery Module 5 are shown in the tractor truck. Road-Wheel Modules 6 are shown under the tractor truck and the semi-trailer. Atop the semi-trailer is a Photovoltaic Module array 7. And, arrow 8 indicates the roof height of the semi-trailer.

In operation, the individual GenSets 4 automatically turn on and off to meet the net power demands of the vehicle. While three GenSets are shown in the diagram for simplicity, any number that is suitable for the application can be used. The electrical current is diagrammatically shown in broken lines traveling to the Battery Module 5. In practice, the GenSets charge the Battery Module(s) and also optionally direct current to the Road-Wheel Modules 6.

A single Battery Module 5 is shown in the tractor truck 1 for simplicity, but a multiplicity of Battery Modules may be located within the tractor-truck and or in the semi-trailer 2 as is suitable for the vehicle. While in this FIG. 1 diagram, the Battery Module is shown to be receiving energy from the GenSets 4, and receiving energy from the regenerative Road-Wheel Modules 6, and receiving energy from the Photovoltaic Module array 7 atop the semi-trailer roof . . . the Battery Module(s) also provide stored energy to power the vehicle and its various systems.

Arrow 8 shows the roofline of the semi-trailer 2 being somewhat higher than the roofline of the tractor truck 1 which height differential is common in these types of long-haul heavy duty vehicles. Lowering the height of the semi-trailer without diminishing its cargo capacity will reduce the frontal area of the vehicle system, which in turn reduces its power requirements at highway cruising speeds and thus reduces fuel consumption. In following descriptions, a Variable-Height Suspension Module element of the present invention will be shown in more detail.

Figure 2:
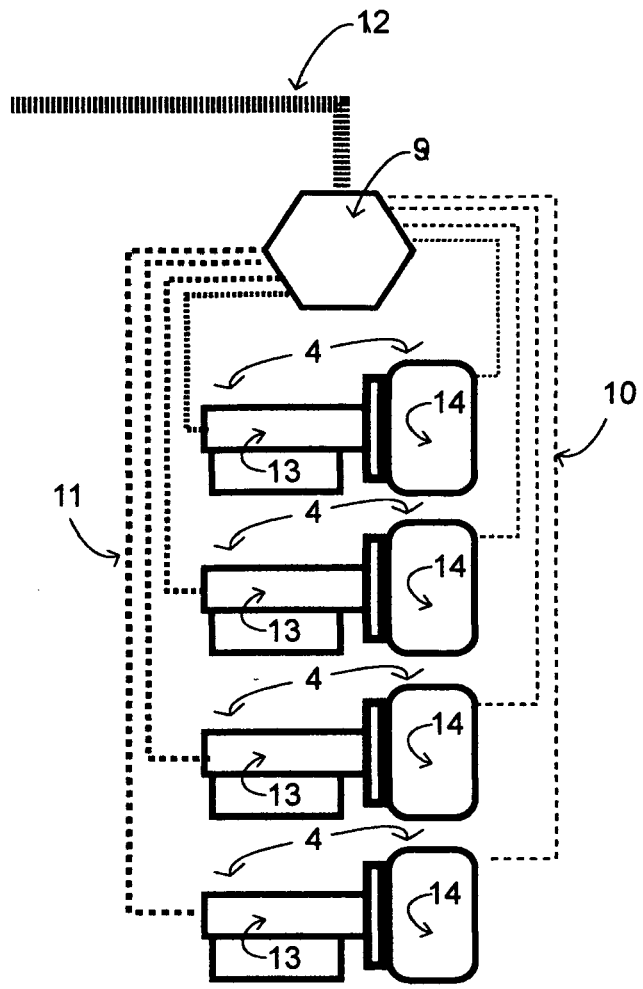
FIG. 2 shows a schematic view of four individual GenSets and a Central Component Management Unit.

FIG. 2 shows a schematic view of four individual GenSets 4 and a Central Component Management Unit 9. In this particular embodiment of the invention, each GenSet consists of a single internal combustion engine 13 driving a single electrical generator or alternator 14. While for simplicity of illustration, the GenSets are shown as similar sized, a variety of types, sizes, and multiplicity of units can be used singly and or in combination as best suits the vehicle. Additionally, as fuel cells become viable, they too can be included within the system. The Central Component Management Unit 9 manages each engine 13 as is schematically depicted by broken lines 11. Similarly, the Central Component Management Unit monitors the generator or alternator 14 of each GenSet as is depicted by broken lines 10. The Central Component Management Unit 9 interfaces with the vehicle's and trailers' other systems and Modules. This multiplicity of fixed speed range optimized GenSets meets the varying net power demands of the vehicle by each automatically turning on as needed to augment the stored energy of the Battery Module(s), and automatically individually turning off when power demands incrementally decrease . . . thus maximizing fuel efficiency of the vehicle.

While various examples of internal combustion engine—hybrid electric drive automobiles and light trucks can be found in the prior art, their configuration generally consists of a single internal combustion engine which powers the road-wheels by one of the following methods:

a) The internal combustion engine is connected to an electrical generator which provides electrical power to the Road-Wheels via electrical motor(s), and which also charges electrical storage units (usually batteries) within the vehicle.

b) The internal combustion engine is connected to the Road-Wheels via a conventional transmission and mechanical drive line, and is also connected to a generator which charges electrical storage units . . . and which units then supply stored energy to electrical motors that assist the Road-Wheels on demand.

While there are a great many variations of these two basic methods, they rely on a single internal combustion engine which must vary its power output to provide the varying levels of energy required of the vehicle and its systems.

For example, a typical automobile, light truck, or SUV requires about 30 horsepower for normal driving speeds, but requires significantly more horsepower for fast acceleration to merge into speeding traffic or for climbing hills. So the great majority of these vehicles are manufactured with internal combustion engines that can produce 300 horsepower to meet peak power demands. But varying the speed on an internal combustion engine significantly reduces it fuel economy and increases production of emissions.

Generally, internal combustion engines have a single speed and temperature where output power and fuel economy is optimum. Varying the speed and power output of an internal combustion engine from this optimum range reduces its efficiency and increases its fuel consumption.

So one of the challenges to maximize fuel economy for internal combustion engine powered hybrid electric vehicles is to have the engine running at its best single optimum speed, while providing a great range of varying power to the Road-Wheels.

While automobiles and light trucks can approach this goal by using smaller engines, and by charging a bank of batteries within the vehicle so that the battery power can be used to provide short bursts of additional power for acceleration, this reliance on stored battery energy does not work for medium and heavy duty (Class 4 to 8) long haul, heavily loaded trucks. This is because increases in stored electrical power requires increases in the number and weight of the batteries within the vehicle. For prolonged high-output energy use in heavy vehicles carrying 10,000 to 40,000 pounds up long mountain climbs, the quantity and weight of batteries required to meet these power needs greatly offsets any fuel saving benefits they provide. Moreover the space volume of the batteries required would reduce the payload and lower the revenue per mile of the vehicle.

So the problem for fuel efficient internal combustion engine hybrid-electric heavy vehicles remains providing a varying amount of power to the Road-Wheels for climbing long grades and accelerating, while using the smallest fuel efficient engine possible for normal driving conditions.

My invention solves the problem by using a multiplicity of constant speed internal combustion engines maximized for fuel efficiency, where each drives an electrical generator or alternator singularly or in combination (hereinafter called a Modular GenSet) that are used in various combinations to meet the varying power demands of the vehicle.

The electrical output of the Modular GenSets is routed to a buffer electrical storage array (batteries, capacitors, and or other electrical storage type units), and is also optionally directed to the Road-Wheel motors to allow the batteries and Modular GenSets to provide maximum power at the same time.

As is common with stationary internal combustion engine electrical power generating sets, the Modular GenSet engines run at a fixed speed which yields maximum fuel economy and maximum engine life . . . while providing continuous electrical power at the rated output of the unit. And while gasoline engines or fuel cells are the thermal engine of choice for hybrid automobiles, light trucks, and SUVs, the engine of choice in the Modular GenSet is diesel, because in hybrid configurations where a thermal engine drives a generator with DC output conditioning . . . diesel engines achieve the highest system efficiency compared to gasoline and turbine engines, and to fuel cells. And since diesel is also the fuel of choice for medium and Class 8 heavy-duty trucks, no change in the nation's fuel infrastructure is required.

In operation, one of the Modular GenSets is used for minimal power requirements, while the others are not running. As the vehicle requires more power, one or more Modular GenSets automatically start and provide power on demand.

For example, at idle one Modular GenSet provides the power necessary to run all the subsystems of the vehicle (brakes, compressors, power steering, air-conditioning, lights, etc) while charging the battery array. When mildly accelerating, a second Modular GenSet automatically starts and provides additional power. Where rapid acceleration is needed, a third and even a forth Modular GenSet will also activate. The lag between pushing the throttle with the foot and the power being supplied by the Modular GenSet is eliminated by the immediate output of the battery array power.

Once cruise speed is achieved, the unneeded Modular GenSet(s) automatically turn themselves off, so only the most fuel efficient combination of Modular GenSets are being used for the desired speed and load of the vehicle.

Where long steep mountain inclines are encountered, the appropriate number of Modular GenSets come on line for as long as needed to maintain the uphill speed of the vehicle.

Uniquely, the multiplicity of Modular GenSets means that an engine or a generator failure minimally effects the performance of the vehicle . . . allowing it to complete its mission before a repair is necessary.

Moreover, because the Road-Wheels are electric motor driven, the Modular GenSets can be commingled with diesel micro-turbines and with fuel cells when they become effective for use in long-haul heavy load vehicles.

And, because the Modular GenSets are connected to the Road-Wheel motors by an electrical cable, and they are much smaller and lighter weight than a conventional diesel truck engine with its bulky transmission and drive line, . . . the GenSets can be located anywhere within the vehicle to provide maximum utilization of space and carrying load.

Figure 3:
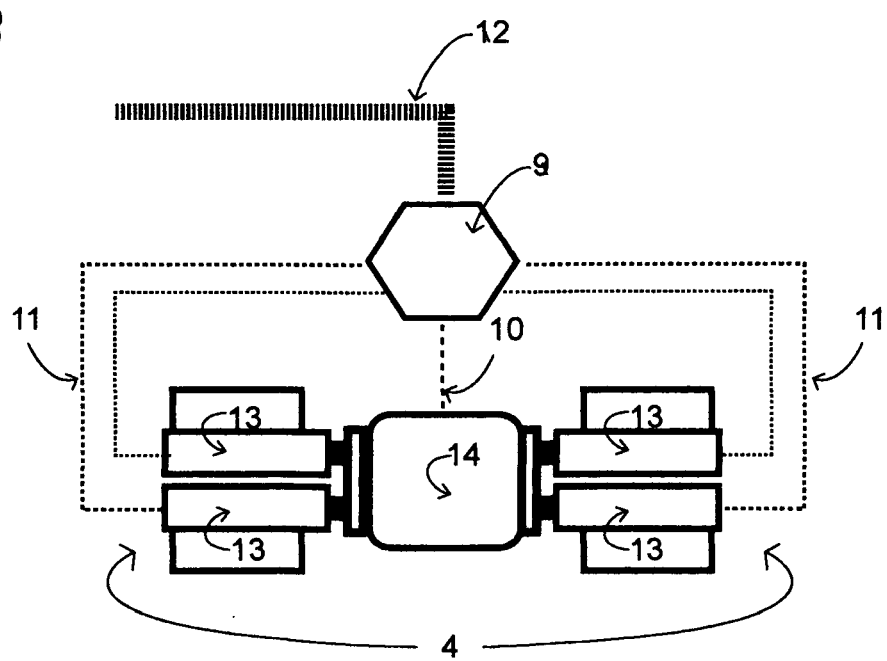
FIG. 3 shows a schematic view of four individual optimized internal combustion engines, a central generator, and a Central Component Management Unit.

FIG. 3 shows a schematic view of four individual optimized internal combustion engines 13, a central generator or alternator 14, and a Central Component Management Unit 9. While FIG. 2 shows one engine matched to one generator or alternator, this embodiment of the invention shows a multiplicity of engines driving a single generator or alternator.

In this GenSet arrangement, each engine comes on line as described in FIG. 2 to engage the same generator or alternator. This similarly provides individualized engines running singly or in combination to meet the varying energy demands of the vehicle. The Central Component Management Unit 9 otherwise operates as described in FIG. 2.

Figure 4:
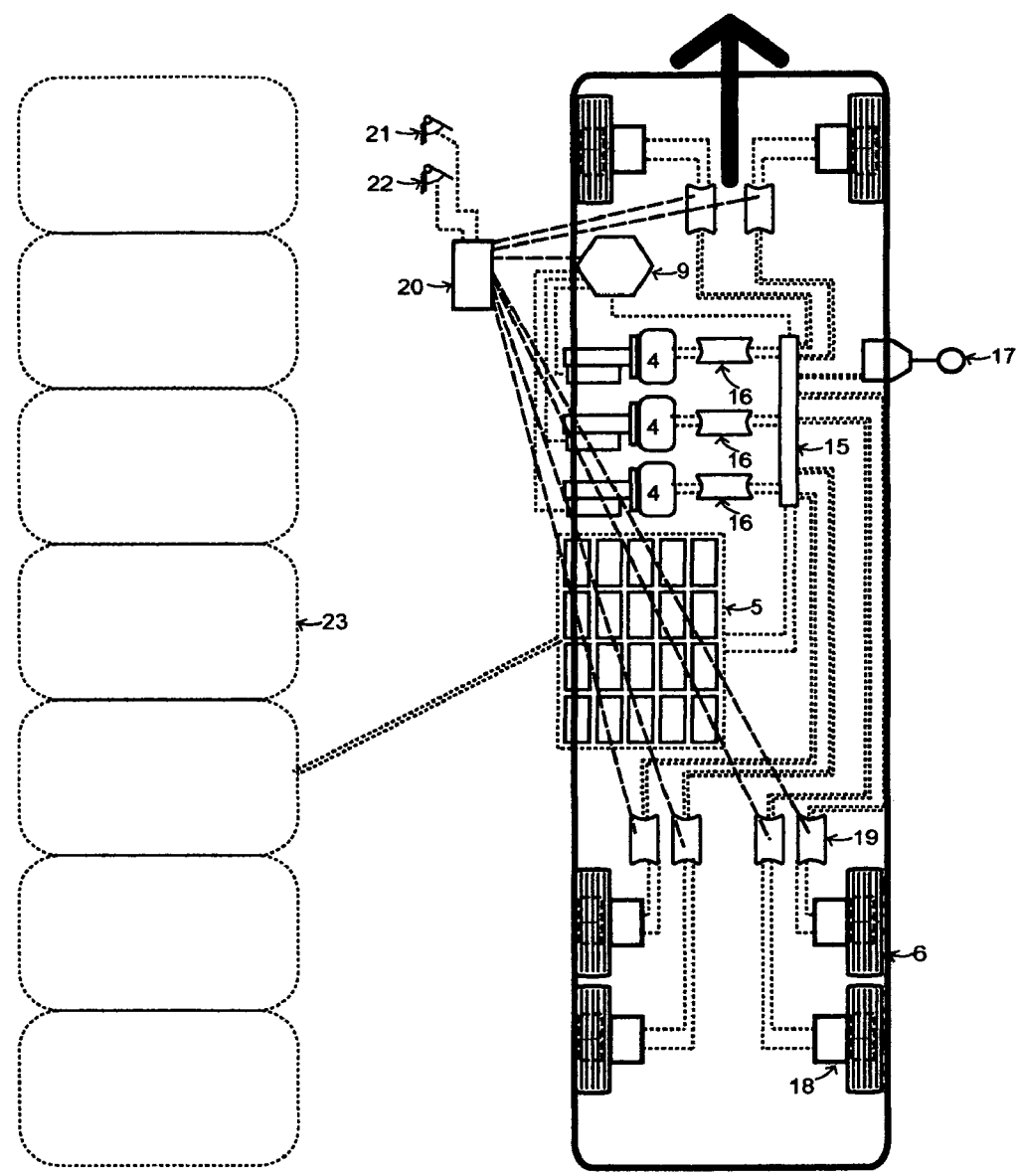
FIG. 4 shows a schematic component view of a six road-wheel vehicle and a solar panel array.

FIG. 4 shows another embodiment of a schematic component view for a six road-wheel vehicle and a solar panel array. While mechanical drive systems (transmission, rotating shafts, differential, and the like) and hydraulic drive systems are within the scope of this invention, the preferred embodiment is a hybrid-electric drive system where the Road-Wheels are individually driven by individual electric motors and the electrical generation source is provided by a multiplicity of GenSets.

The unique basis of this system consists of a multiplicity of small electrical power generation units running at each engine's individual optimum efficiency which are used in combination to provide the electrical power necessary to run the Road-Wheel Modules, charge the Battery Module(s), or to do both. In traditional hybrid-electric applications, a single internal combustion engine is used to provide electrical power by turning an electrical generating device (generator, alternator, and the like). In small vehicles like automobiles, there are a great number of high-production low-cost internal combustion engines suitable for producing sufficient electrical power for the automobile size vehicle's electric wheel drive motors. The same application in large bus, truck, and motorhome sized vehicles traditionally requires a much larger engine to meet the much greater electrical power demands of these large scale vehicles. But, because the large sized internal combustion engines (usually diesel) that are suitable for these large scale vehicles are made in limited low-volume production quantities, their unit costs, repair part costs, and maintenance labor costs are significantly disproportionate in capital costs when compared to the high-volume mass-production smaller automotive engines. In this invention, a multiplicity of small inexpensive engine-generator units are used instead of a large engine-generator producing the same amount of electrical power. The benefits of multiple small inexpensive GenSet units is that the resultant engine capital cost is lower, the vehicle reliability is significantly increased, fuel consumption is greatly reduced, atmosphere pollutants are decreased, the center of gravity of the vehicle can be lower, the interior utilization of vehicle space is enhanced, maintenance is easier, and multiple generation sources (fuel cell, turbine, solar cell array, land lines) can be utilized interchangeably.

In a typical operation of another embodiment, the primary source of developing electrical power is from a number of small Gensets 4 connected to a Battery Interface Switch 15. A Genset 4 is composed of a small diesel or other type fuel engine that drives a high output generator or alternator. Where an alternator is used, a Genset Controller 16 converts the electrical output to DC for storage into the Battery Module 5. Optionally, the AC electrical output is routed through a switcher directly to the Road-Wheel Modules 6. The Gensets 4 can be augmented or replaced by fuel cells within the scope of this invention. The Battery Module 5 also receives electrical energy from the Road-Wheel Modules 6 when they are used to slow the vehicle (regenerative braking), and from the shore power electrical grid 17, and from the solar cell array atop the vehicle and or its trailer(s). Each Road-Wheel Module 6 is independently suspended from its mounting point on the vehicle by a Variable-Height Suspension Module 18. And each Road-Wheel Module 6 is capable of being steered, where an all-steering vehicle is needed. Where the Road-Wheel Module 6 use AC current, Motor Controllers 19 make the conversion between AC and DC power and control the power input to the respective motor. A Central Component Management Unit 9 monitors input and output signals of all components, and controls the operation of the Gensets 4, the Battery Interface Switch 15 which controls the power to each motor and controls the battery charge & discharge rate, the battery box temperature, and the battery fluid levels, and interfaces with the Vehicle Controller 20. The Vehicle Controller 20 provides signals from the throttle pedal 21, the brakes 22, the turn indicators, the steering wheel, and the vehicle accessories & ancillary equipment and links them to the Central Component Management Unit 9.

For example, when the throttle pedal 21 is depressed, the Vehicle Controller 20 signals the Central Component Management Unit 9 which activates the Battery Interface Switch 15 to provide electrical power to the Road-Wheel Modules 6 (via the Motor Controllers 19 where applicable). Depending upon the mode selected, all wheels are driven or only the selected set of wheels. The functions of positive-traction and differential rotating rates of the wheels in a turn is controlled by the Central Component Management Unit 9. When the brake pedal is depressed 22, the Road-Wheel Modules 6 are switched to function as electrical generators which slow the vehicle depending upon the pressure on the pedal, and then the service brakes complete the stopping of the wheel. The electrical power generated in the Road-Wheel Modules when being braked is stored in the Battery Module 5.

While the Road-Wheel Modules 6 normally draw their electrical energy from the Battery Module(s) 5, for high demand power requirements in extreme acceleration situations, the electrical energy output of the Gensets 4 in series-parallel with the electrical energy of the Battery Module(s) 5 is available to the motors. This combined series-parallel use of the Gensets and the Battery Modules provides substantially more electrical demand energy to the motors than otherwise possible.

Rooftop Photovoltaic Module(s) 23 convert solar energy to electricity, which is routed through the Battery Interface Switch 15 to the Battery Module(s) 5. While Photovoltaic Module(s) are not meaningful on small automobile size vehicles, a typical long-haul truck with one or two semi-trailers provide upwards of 500 square feet of solar cell rooftop surface, which electrical energy is significant enough to lower the fuel consumption per mile of the vehicle. In sunny climes, the Photovoltaic Module(s) freely provide energy to run refrigerated trailers, without the need of diesel, gasoline, or other thermal fuels.

Figure 5:
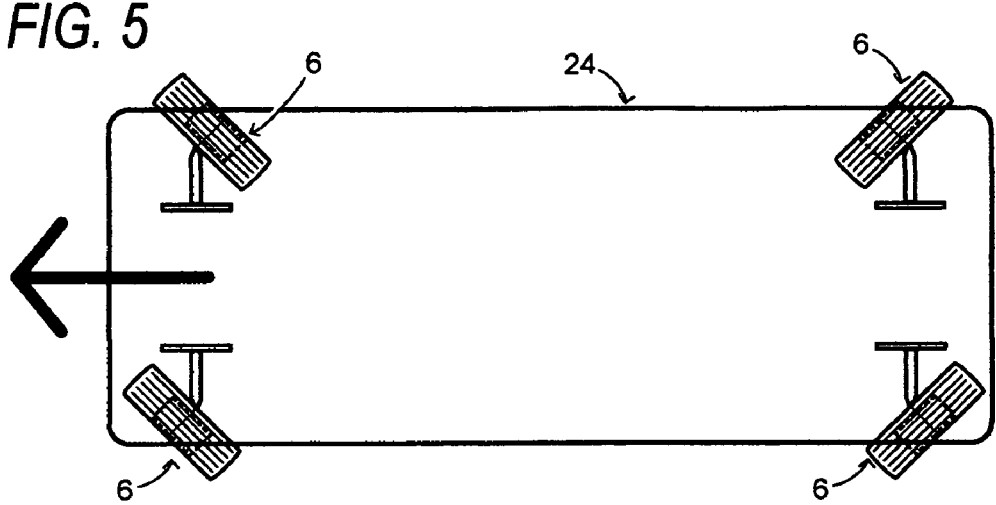
FIG. 5 shows a schematic top view of a vehicle chassis depicting four steerable road-wheels.

FIG. 5 shows a schematic top view of a vehicle chassis 24 depicting four steerable road-wheels 6. In this embodiment of the present invention, this vehicle is about the size of a delivery step van or a SUV which illustrates its application in smaller vehicles. The steerable rear Road-Wheel Modules allow the vehicle to park in small places, and to make smaller radius turns than otherwise possible.

Figure 6:
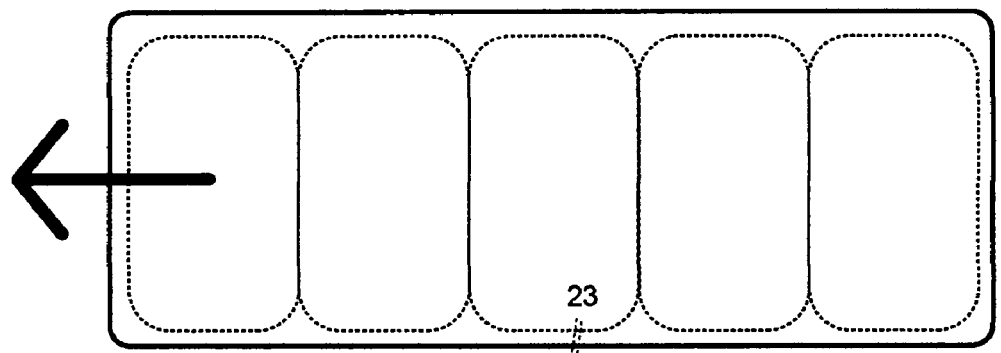
FIG. 6 shows a schematic solar panel array atop the vehicle in FIG. 5.

FIG. 6 shows a Photovoltaic Module 23 schematic of a solar panel array atop the vehicle in FIG. 5.

Figure 7:
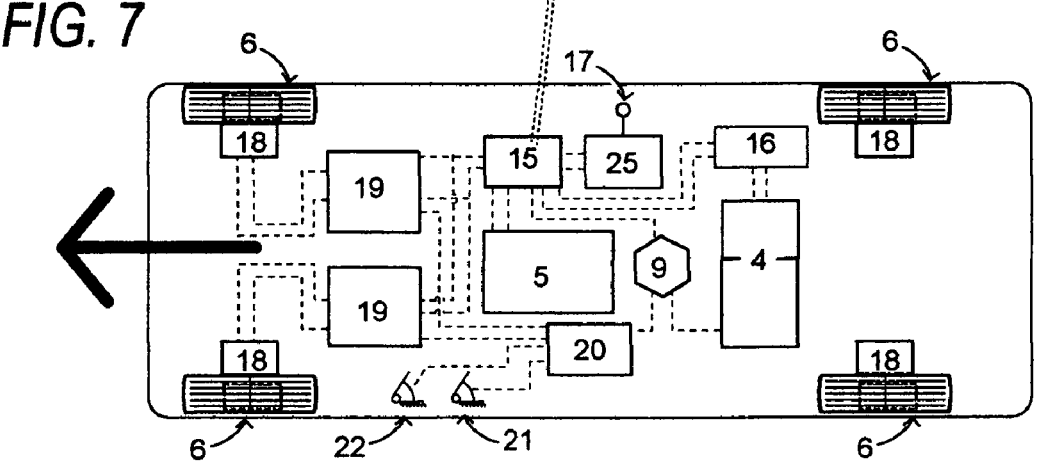
FIG. 7 shows a schematic component view of the vehicle in FIG. 5.

FIG. 7 shows a schematic component view of the vehicle in FIG. 5. In this embodiment, the vehicle is arranged with front drive steerable Road-Wheel Modules 6 and non-motorized steerable wheels at the rear. In operation, the primary source of developing electrical power is from a number of small Gensets 4. A Genset 4 is composed of a small gasoline, diesel or other type fuel engine that drives a high output generator or alternator. Where an alternator is used, a Genset Controller 16 converts the electrical output to DC for storage into the Battery Module 5 which is routed through a Battery Interface Switch 15. Optionally, the AC electrical output is routed through a switcher directly to the Road-Wheel Modules 6. The Gensets 4 can be augmented or replaced by fuel cells within the scope of this invention. The Battery Module 5 also receives electrical energy from the Road-Wheel Modules 6 when they are used to slow the vehicle (regenerative braking), and from the shore power electrical grid 17, and from the solar cell array 27 atop the vehicle. Each Road-Wheel Module 6 is independently suspended from its mounting point on the vehicle by a Variable-Height Suspension Module 18. And each Road-Wheel Module 6 is capable of being steered. As this is configured as a front wheel drive vehicle, the Road-Wheel Modules 6 are located at the front of the vehicle, and steerable non-drive wheels are located at the rear of the vehicle, which similarly utilize Variable-Height Suspension Modules 18. Where the Road-Wheel Module 6 use AC current, Motor Controllers 19 make the conversion between AC and DC power and control the power input to the respective motor. A Central Component Management Unit 9 monitors input and output signals of all components, and controls the operation of the Gensets 4, the Battery Interface Switch 15 which controls the power to each motor and controls the battery charge & discharge rate, the battery box temperature, and the battery fluid levels, and interfaces with the Vehicle Controller 20. The Vehicle Controller 20 provides signals from the throttle pedal 21, the brakes 22, the turn indicators, the steering wheel, and the vehicle accessories & ancillary equipment and links them to the Central Component Management Unit 9.

For example, when the throttle pedal 21 is depressed, the Vehicle Controller 20 signals the Central Component Management Unit 9 which activates the Battery Interface Switch 15 to provide electrical power to the Road-Wheel Modules 6 (via the Motor Controllers 19 where applicable). The functions of positive-traction and differential rotating rates of the wheels in a turn is controlled by the Central Component Management Unit 9. When the brake pedal is depressed 22, the Road-Wheel Modules 6 are switched to function as an electrical generators which slow the vehicle depending upon the pressure on the pedal, and then the service brakes complete the stopping of the wheel. The electrical power generated in the Road-Wheel Modules when being braked is stored in the Battery Module 5. While the Road-Wheel Modules 6 normally draw their electrical energy from the Battery Module(s) 5, for high demand power requirements in extreme acceleration situations, the electrical energy output of the Gensets 4 in series-parallel with the electrical energy of the Battery Module(s) 5 is available to the motors. This combined series-parallel use of the Gensets and the Battery Modules provides substantially more electrical demand energy to the motors than otherwise possible.

Optionally, rooftop Photovoltaic Module(s) 23 convert solar energy to electricity, which is routed through the Battery Interface Switch 15 to the Battery Module(s) 5.

Figure 8:
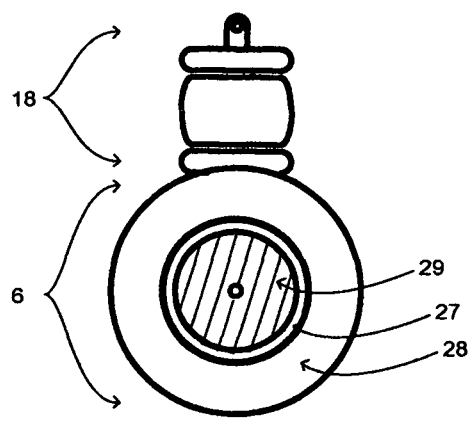
FIG. 8 shows a schematic side view of a Road-Wheel Module and a Variable-Height Suspension Module.

FIG. 8 shows a schematic side view of a Road-Wheel Module 6 and a Variable-Height Suspension Module 18. Also shown is a tire 28 mounted on a wheel 27 connected to a motor 29. For simplicity, a motor is shown with the wheel 27, but any suitable connection between the wheel 27 and the motor 29 is within the scope of the present invention.

Figure 9:
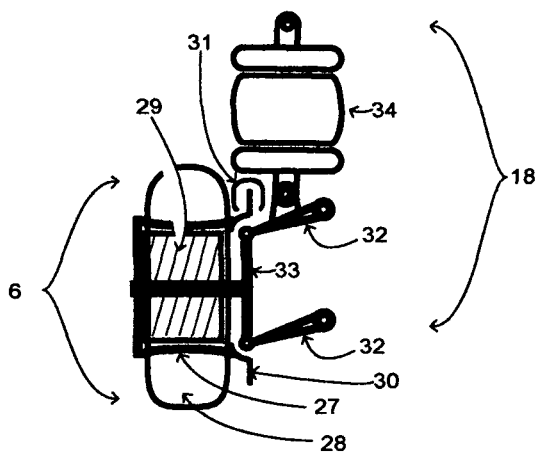
FIG. 9 shows a schematic front view of FIG. 8.

FIG. 9 shows a cross sectional schematic front view of FIG. 8 where the Variable-Height Suspension Module 18, located behind the Road-Wheel Module 6, is more apparent. Also seen is a brake disk 30 and a brake caliper 31 representing the service brakes of the vehicle. While disk brakes are shown for simplicity, any suitable brake system is within the scope of the present invention. Also shown are suspension arms 32 and kingpin 33 allowing the Road-Wheel Module to be optionally steerable. Air spring(s) 34 with adjustable ride height is shown connecting the suspension to the vehicle chassis. While air springs are the simplest method of adjusting vehicle ride height, hydraulic lifts or any suitable method of adjusting the ride height of the vehicle is within the scope of this invention.

Figure 10:
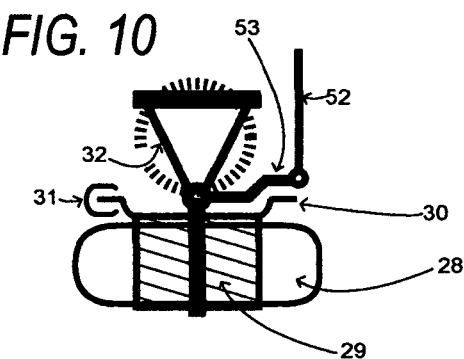
FIG. 10 shows a schematic top view of FIG. 8 with a steering rod.

FIG. 10 shows a cross sectional schematic top view of FIG. 8 with a steering rod. Also seen is the tire 28, the wheel motor 29, the wheel brake disk 30 and a suspension arm 32. A conventional steering arm 53 is affixed to the wheel, and attached to the steering arm is a typical steering rod 52. The Road-Wheels turn the vehicle by means of a steering wheel within the cab of the vehicle.

Figure 11:
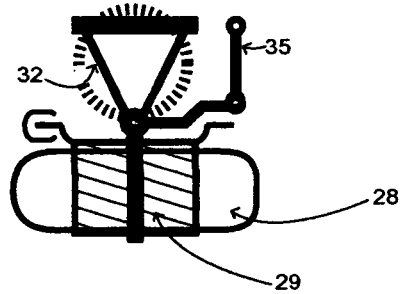
FIG. 11 shows a schematic top view of FIG. 8 with a locking link.

FIG. 11 shows a schematic top view of FIG. 8 with a locking link 35 in place of the steering rod 52 shown in FIG. 10. The utilization of the locking link eliminates the steering feature of the Road-Wheel Modules.

Figure 12:
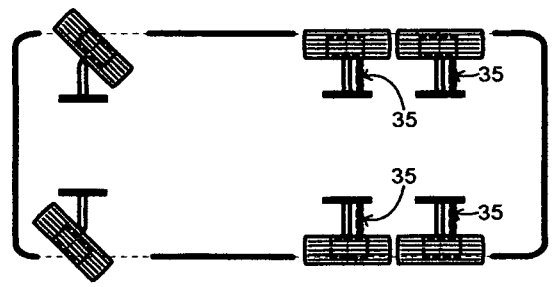
FIG. 12 shows a schematic top view of a six road-wheel vehicle with locking links on the rear wheels.

FIG. 12 shows a schematic top view of a six road-wheel vehicle chassis with locking links 35 on the rear wheels which makes them non-steering. The front wheels are steerable.

Figure 13:
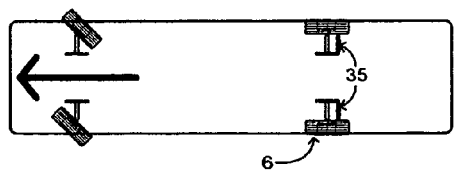
FIG. 13 shows a schematic top view of a four road-wheel vehicle with lock-linked rear wheels.

FIG. 13 shows a schematic top view similar to that of FIG. 12, but depicts a four road-wheel vehicle with two lock-linked rear wheels. FIG. 13 through FIG. 20 are various examples of Road-Wheel arrangements within the scope of the present invention, although the number of wheels is not limited to those shown.

Figure 14:
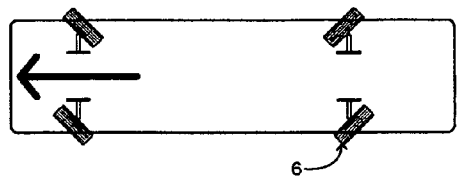
FIG. 14 shows a schematic top view of a four road-wheel vehicle with steerable rear wheels.

FIG. 14 shows a schematic top view of a four road-wheel vehicle with steerable rear wheels.

Figure 15:
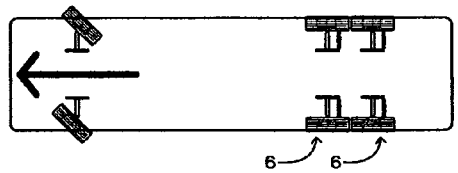
FIG. 15 shows a schematic top view of a six road-wheel vehicle with lock-linked rear wheels.

FIG. 15 shows a schematic top view of a six road-wheel vehicle with four lock-linked rear wheels.

Figure 16:
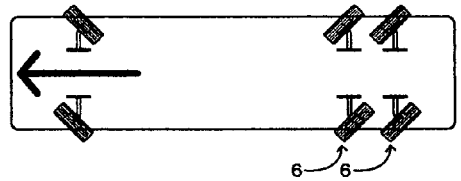
FIG. 16 shows a schematic top view of a six road-wheel vehicle with steerable rear wheels.

FIG. 16 shows a schematic top view of a six road-wheel vehicle with steerable rear wheels.

Figure 17:
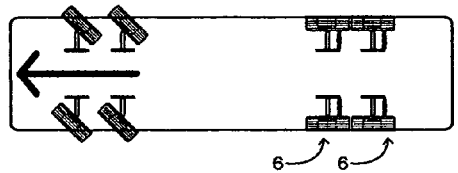
FIG. 17 shows a schematic top view of a eight road-wheel vehicle with lock-linked rear wheels.

FIG. 17 shows a schematic top view of a eight road-wheel vehicle with four lock-linked rear wheels.

Figure 18:
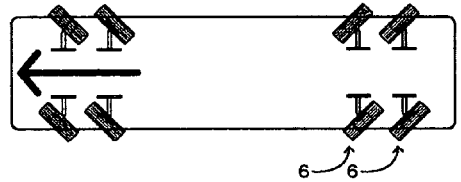
FIG. 18 shows a schematic top view of a eight road-wheel vehicle with steerable rear wheels.

FIG. 18 shows a schematic top view of a eight road-wheel vehicle with steerable rear wheels.

Figure 19:
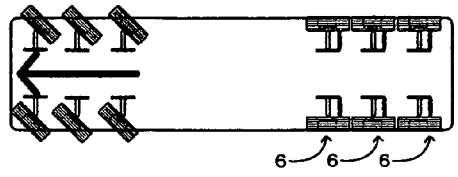
FIG. 19 shows a schematic top view of a twelve road-wheel vehicle with lock-linked rear wheels.

FIG. 19 shows a schematic top view of a twelve road-wheel vehicle with six lock-linked rear wheels.

Figure 20:
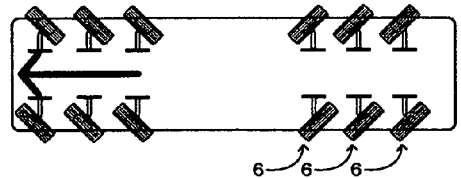
FIG. 20 shows a schematic top view of a twelve road-wheel vehicle with steerable rear wheels.

FIG. 20 shows a schematic top view of a twelve road-wheel vehicle with steerable rear wheels. FIGS. 13 through 20 depict vehicles with a varying number of Road-Wheels. This multi-wheel element of the present invention optionally allows low-power motors to be used at each Road-Wheel Module (rather than the use of a single large motor to drive wheels through a differential), which provides the opportunity for significantly more horsepower at the wheels when needed by applying current to all Road-Wheel Modules. For example, where a 100 horsepower motor is used at each Road-Wheel Module . . . the 12 wheel vehicle of FIG. 20 delivers 1,200 horsepower to the wheels when needed. But when running with light loads, only two Road-Wheel Modules delivering 200 horsepower may be adequate. This makes it possible to retrofit significant horsepower to an existing vehicle of the present invention with minimal effort. When the Road-Wheel Modules are not being energized in this configuration, they are free wheeling, unless the vehicle is braking.

Figure 21:
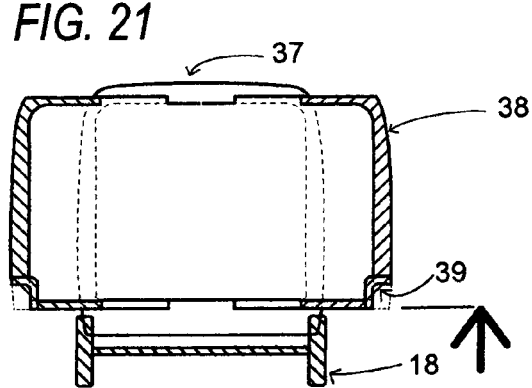
FIG. 21 shows a schematic cross-section of a recreational trailer with slideouts extended.

FIG. 21 is a typical midway cross section of a typical vehicle body showing a slideout expanding room 38 from my U.S. Pat. No. 6,679,543—Recreational Vehicle Full-Length Slideout System and from my patent application Ser.

No. 10/922,479—Thin-Shell UltraLight Recreational Vehicle Body System shown in the open position (extended from the body position) with the recreational vehicle body 37 raised above the Variable-Height Suspension Module 18. With the body 37 in the raised position above the Variable-Height Suspension Module 18, the slideout 38 extends outwardly above the vehicle tires. Also shown are the inner fenders 39 in the slideout. While the illustration of the Variable-Height Suspension Module 18 shows a trailing arm 40 in this embodiment, the variable-height system can be embodied with A-arms, struts, or other suitable suspension means within the scope of this invention with its purpose to lift the slideouts above the vehicle tires for use, and to lower the vehicle body closer to the road for travel to reduce the frontal area of the vehicle, which in turn lowers the tow vehicle's fuel consumption.

Figure 22:
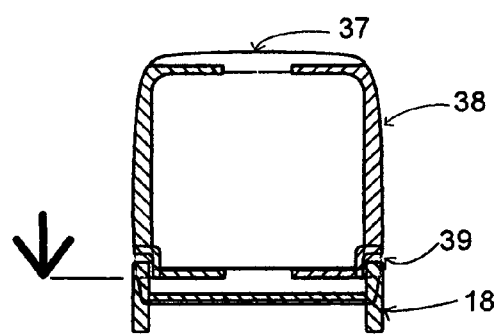
FIG. 22 shows a schematic cross-section of the recreational trailer in FIG. 21 with slideouts retracted.

FIG. 22 is the same midway cross section shown in FIG. 21, but showing the slideout expandable room(s) 38 in the closed position, and the vehicle body 37 in the lowered position for travel. In this lowered position, the vehicle tires recess into inner fenders 39 within the slideout when the vehicle is traveling. Previous to this invention, recreational vehicles with slideouts located over the wheels, required additional vehicle height to allow for the opening and closing of the slideouts, without interfering with the vehicle wheels. This increased height of conventional slideout equipped recreation vehicles increases the frontal area of the vehicle, requiring more power and fuel to travel at the same speed as an equivalent weight vehicle of a lower, smaller frontal area. An essence of this element within the invention is that a slideout equipped recreational vehicle, utilizing the Variable-Height Suspension Module(s) of this invention, will decrease its frontal area when traveling, thereby lowering fuel consumption. And when parked, the Variable-Height Suspension Module(s) raises the vehicle to a conventional height for use of the slideouts.

Figure 23:
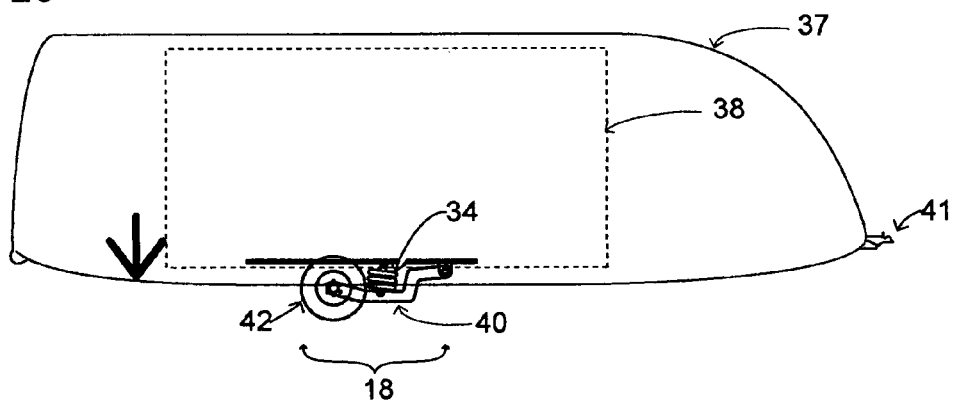
FIG. 23 shows a schematic longitudinal side view of the recreational trailer in FIG. 22.

FIG. 23 is the exterior schematic side view of the same recreational vehicle body 37 shown in FIG. 22, showing the same slideout 38 in broken line, and showing the body 37 in a lowered position on the Variable-Height Suspension Module 18 for travel. Shown at the front of the vehicle is a the trailer hitch 41. For illustrative purposes of the Variable-Height Suspension Module, a trailing arm type suspension is shown, where the trailing arm 40 is pivoted from the vehicle chassis on its forward end, and has a vehicle wheel 42 on its trailing end. In this embodiment of the invention, the trailing arm is sprung from the chassis with an air-bag type spring 34, whereby the residual air in the bag is maintained at a low level for road travel, thus lowering the height of the vehicle body above the road. An optional metal augmentation spring can also be used in conjunction with the air-bag to provide a sprung suspension in the event of an air-bag leak.

Figure 24:
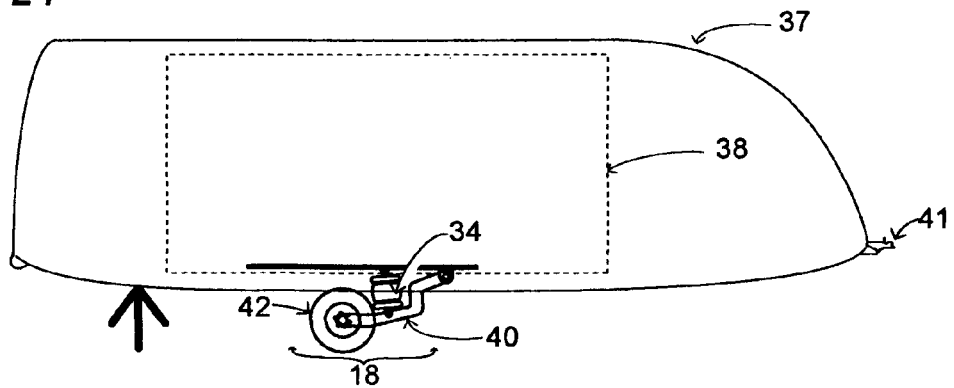
FIG. 24 shows a schematic longitudinal side view of the recreational trailer in FIG. 21.

FIG. 24 is the exterior schematic side view of the same vehicle body 37 shown in FIG. 21, showing the same slideout in broken line 38, and showing the body 37 in a raised position on the Variable-Height Suspension Module 18 to allow the slideouts 38 to extend outward from the vehicle body above the wheels 42. In this illustration, the air-bag spring 34 residual air in the bag is maintained at a high level to allow the use of the slideout, thus raising the height of the vehicle body so that the slideout(s) clear the tops of the tires when extended from the body. Hydraulic, electric, or other suitable suspension lifting units can be utilized within the scope of this invention.

Figure 25:
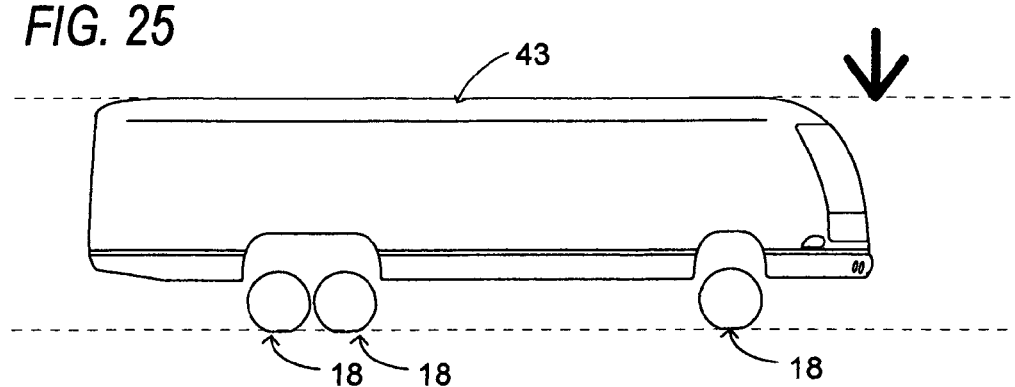
FIG. 25 shows a schematic longitudinal side view of motorhome in the parked position for extending slideouts.

FIG. 25 is an exterior schematic side view of a typical motorhome which, in manner similar to FIG. 24, shows the motorhome body 43 raised above the Variable-Height Suspension Modules 18 to allow slideouts to pass over the tires when being extended from the body.

Figure 26:
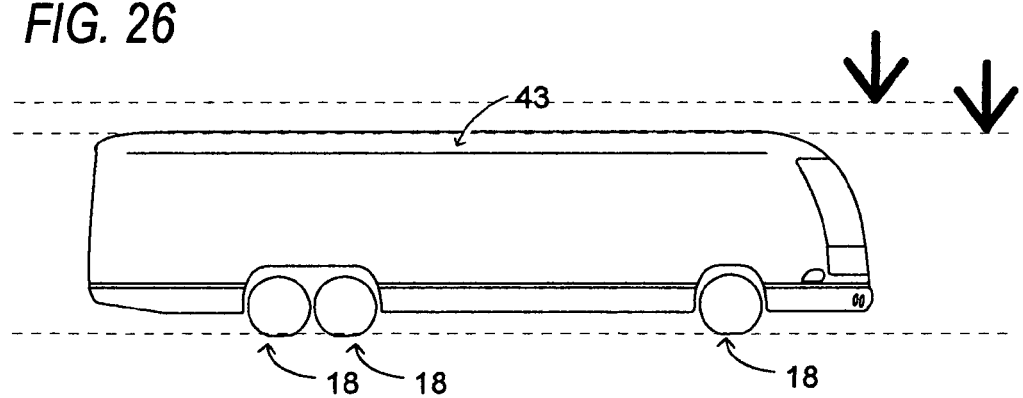
FIG. 26 shows the same schematic longitudinal side view as FIG. 25, but with motorhome lowered closer to the road to reduce frontal area.

FIG. 26 is the same exterior schematic side view of a typical motorhome shown in FIG. 25, but showing the motorhome body 43 lowered on the Variable-Height Suspension Modules 18 for road travel. This increased height of a conventional slideout equipped motorhome increases the frontal area of the vehicle, requiring more power and fuel to travel at the same speed as an equivalent weight vehicle of a lower, smaller frontal area. An essence of this element within the invention is that a slideout equipped recreational vehicle, utilizing the Variable-Height Suspension Module(s) of this invention, will decrease its frontal area when traveling, thereby lowering fuel consumption. And when parked, the Variable-Height Suspension Module(s) raise the vehicle to a conventional height for use of the slideouts. As will be seen in the following descriptions, this Variable-Height Suspension Module principle of my inventions applied to long-haul tractor trucks and semi-trailers leads to a reduction in the frontal area of these vehicle-trailer systems, thereby lowering fuel consumption.

Figure 27:
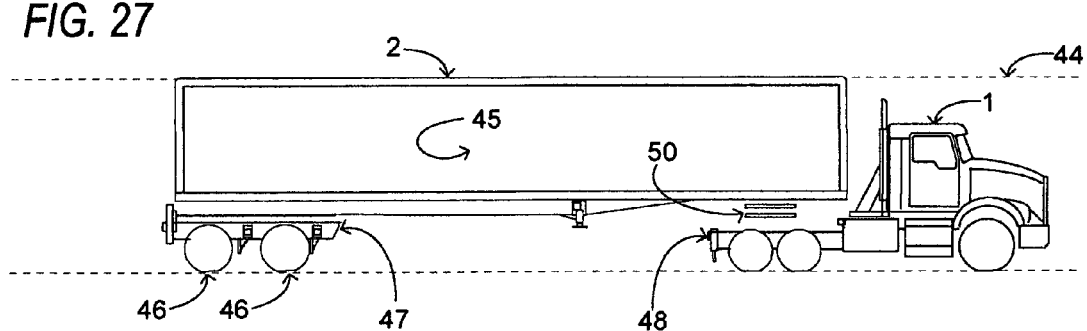
FIG. 27 shows a schematic longitudinal side view of a tractor truck and semi-trailer with conventional ride height.

FIG. 27 shows a schematic longitudinal side view of a tractor truck 1 and semi-trailer 2 with conventional ride height of the trailer. The broken line 44 extending from the rooftop of the trailer is shown in relationship to the rooftop of the tractor truck. The box size 45 and internal volume of the trailer is the same as for conventional trailers of similar dimensions. This embodiment of the present invention utilizes trailer tires and wheels 46 of a wider profile and smaller diameter which meet current tire load, wear, and safety standards of conventional semi-trailer tires. And the trailer chassis 47 incorporates the Variable-Height Suspension Module(s) as previously revealed within this invention, so that the trailer height can be automatically lowered from the cab of the truck. Similarly, the tires on the tractor truck are also of the wider profile, smaller diameter size . . . and the rear of the truck chassis 48 is manufactured lower to the ground to accommodate these reduced diameter tires. The fifth wheel coupling 50 for the semi-trailer is provided with a suitable means to raise and lower the trailer height from the cab of the truck. In operation at standard height loading docks, and when maneuvering over bumpy terrain where the standard semi-trailer clearance is desirable, the trailer is positioned at it standard height shown in FIG. 27.

Figure 28:
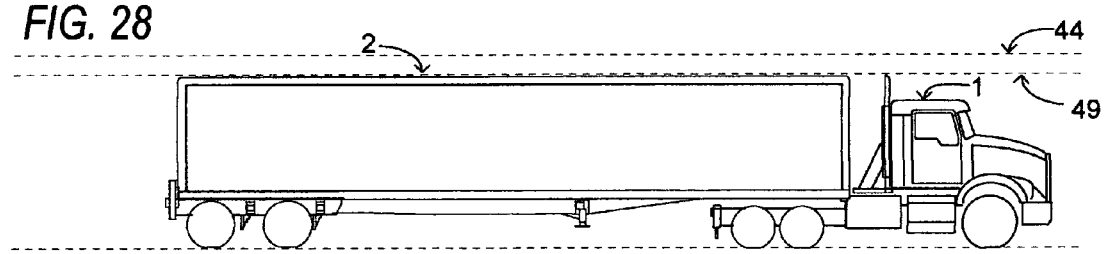
FIG. 28 shows the same schematic longitudinal side view as FIG. 27, but with the tractor truck and semi-trailer lowered closer to the road to reduce frontal area.

FIG. 28 shows the same schematic longitudinal side view as FIG. 27, but with the tractor truck 1 and semi-trailer 2 lowered closer to the road which reduces the original standard height of the trailer 44 to a lower overall height as shown by broken line 49. This reduction in trailer height proportionately reduces the frontal area of the trailer-truck system, which then requires proportionately less power and fuel consumption to pull the same load at highway speeds on a level roadway.

Figure 29:
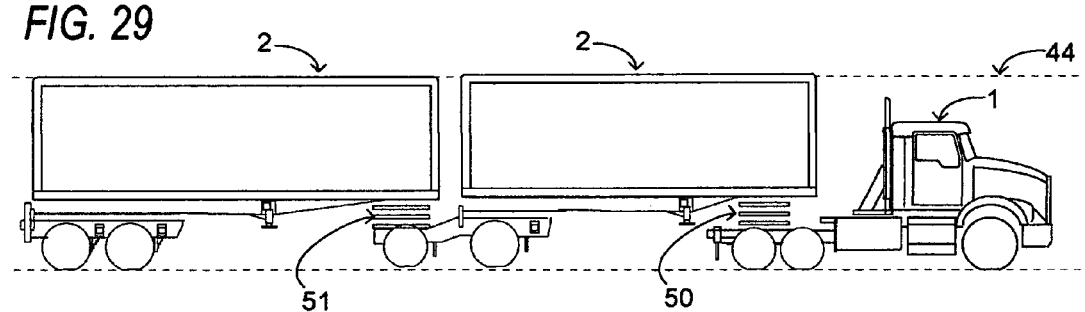
FIG. 29 shows a schematic longitudinal side view of a tractor truck and two semi-trailers with conventional ride height.

FIG. 29 shows a schematic longitudinal side view of a tractor truck 1 and two semi-trailers 2 with standard ride height. While the truck and the first hitched trailer are substantially the same as described in FIG. 27 with the exception of trailer length, the rear chassis of the trailer chassis is suitably designed to tow the second trailer. This arrangement of two trailers is commonly referred to as an "A" or "B" Train. The adjustable-height fifth wheel coupling 51 for the second trailer is similar to the adjustable-height fifth wheel coupling 50 of the tractor truck, so that both semi-trailers are capable of lowering their height from the truck cabin.

Figure 30:
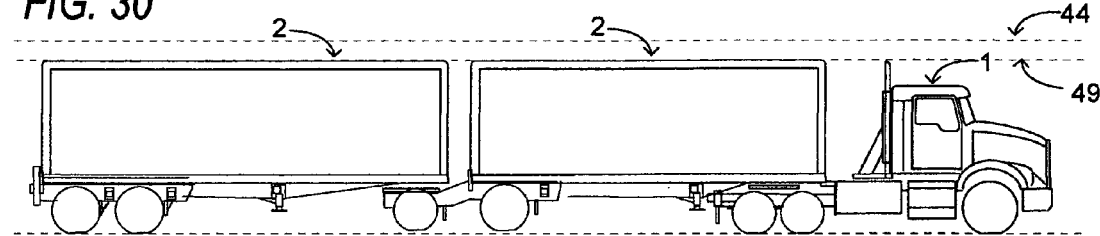
FIG. 30 shows the same schematic longitudinal side view as FIG. 29, but with the tractor truck and its two semi-trailers lowered closer to the road to reduce frontal area.

FIG. 30 shows the same schematic longitudinal side view as FIG. 29, but with the tractor truck 1 and its two semi-trailers 2 lowered closer to the road to reduce frontal area . . . and to reduce fuel consumption.

Figure 31:
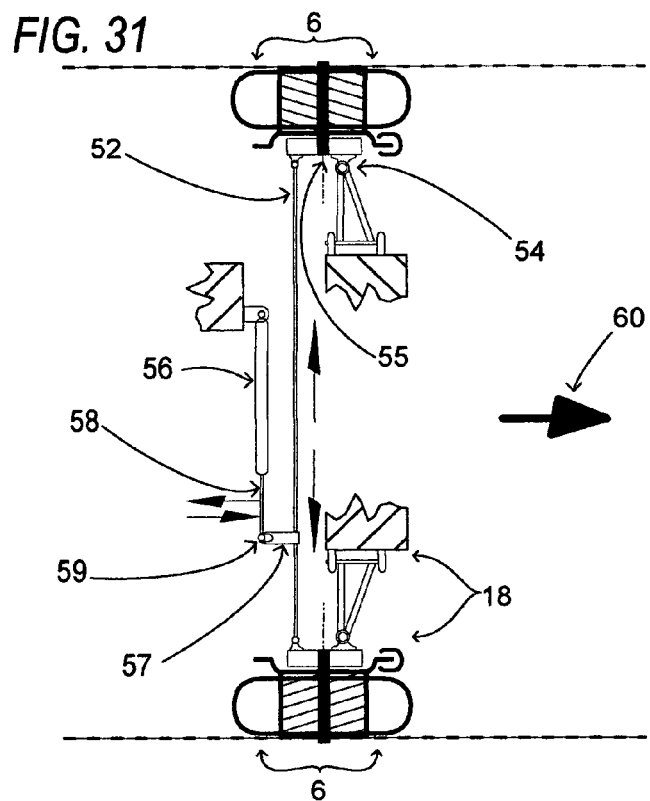
FIG. 31 shows a schematic top view of two Road-Wheel Modules and two suspension modules on a common axle centerline embodied in a "single axle" application, and depicts one embodiment of the invention with castering and with steering wheels.

FIG. 31 depicts a cross sectional schematic top view of the Road-Wheel Module system similar to that of FIG. 10, but showing the Road-Wheel Module 6 and the Variable-Height Suspension Module 18 on the curb side of the vehicle, and a Road-Wheel Module 6 and a Variable-Height Suspension Module 18 on the street side of the vehicle. Arrow 60 depicts the forward travel direction of the vehicle or the trailer. In this embodiment of the present invention, the Road-Wheels' pivot points are located forward of the Road-Wheel axle points, so that the Road-Wheels freely pivot to follow the direction of the vehicle. Of essence in this embodiment of the invention, the pivot point 54 is located well forward of the centerline of the wheel axle point 55, allowing the Road-Wheel 6 to act like a conventional caster that automatically follows the direction of the trailer, much like the caster wheels on a shopping cart follow the direction the shopping cart's travel. A steering tie rod 52 joins to the rear of the wheel hubs on each side of the trailer, so that the wheels on both sides of the trailer turn in unison. A remote controlled actuator 56 with an extending and retracting arm 58 with a locking latch 59 at the end of the arm 58, is remotely lockable to the mating latch 57 on the steering tie rod 52. When the remote controlled actuator 56 is locked to the steering tie rod 52, the position of the actuator extending arm 58 determines the position of the Road-Wheels 6. The Locked-On Position and Locked-Off Position of the locking latch 59 and the mating latch 57 is remotely controlled from the tow vehicle. In the Locked-On Position, the wheels can be locked in the straight-ahead position like a convention trailer, or they can be remotely steered by an electrical actuator direction-control-switch located in the tow vehicle or in an elsewhere suitable location. In the Locked-Off Position, the Road-Wheels 6 freely pivot (caster) when traveling. While the drawings depict actuators, tie rods, and a latching system to illustrate this embodiment of the invention, any suitable means to allow the wheels to caster and or to steer are intended to be within the scope of this invention.

Figure 32:
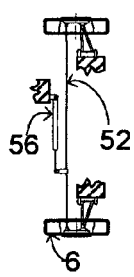
FIG. 32 depicts the same schematic top view of the Road-Wheel Modules in FIG. 31, but in smaller scale.

FIG. 32 is a reduced-size schematic top view illustration as shown in FIG. 31, illustrating the actuator 56 locked to the tie rod 52, and the wheels 6 locked in a straight-ahead position.

Figure 33:
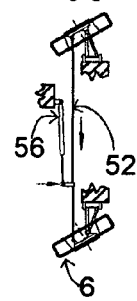
FIG. 33 depicts the same schematic top view of the Road-Wheel Modules in FIG. 31, but with the wheels steering to the left.

FIG. 33 is the same reduced-size schematic top view illustration as shown in FIG. 32, illustrating the actuator 56 locked to the tie rod 52, and steering the wheels 6 to the left.

Figure 34:
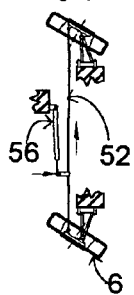
FIG. 34 depicts the same schematic top view of the Road-Wheel Modules in FIG. 31, but with the wheels steering to the right.

FIG. 34 is the same reduced-size schematic top view illustration as shown in FIG. 32, illustrating the actuator 56 locked to the tie rod 52, and steering the wheels 6 to the right.

Figure 35:
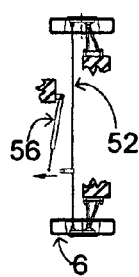
FIG. 35 is the same reduced-size schematic top view illustration as shown in FIG. 32, but illustrating the actuator unlocked from the tie rod, allowing the wheels to freely pivot.

FIG. 35 is the same reduced-size schematic top view illustration as shown in FIG. 32, but illustrating the actuator 56 unlocked from the tie rod 52, allowing the wheels 6 to freely pivot.

Figure 36:
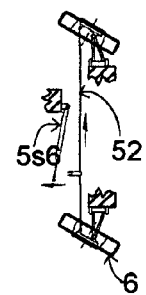
FIG. 36 depicts the same schematic top view of the Road-Wheel Modules in FIG. 35, but with the wheels steering to the left.

FIG. 36 is the same reduced-size schematic top view illustration as shown in FIG. 32, with the actuator 56 unlocked from the tie rod 52, and showing the wheels 6 freely pivoting (castering) to the right following the direction of the vehicle.

Figure 37:
FIG. 37 depicts the same schematic top view of the Road-Wheel Modules in FIG. 35, but with the wheels steering to the right.

FIG. 37 is the same reduced-size schematic top view illustration as shown in FIG. 32, with the actuator 56 unlocked from the tie rod 52, and showing the wheels 6 freely pivoting (castering) to the left following the direction of the vehicle.

Figure 38:
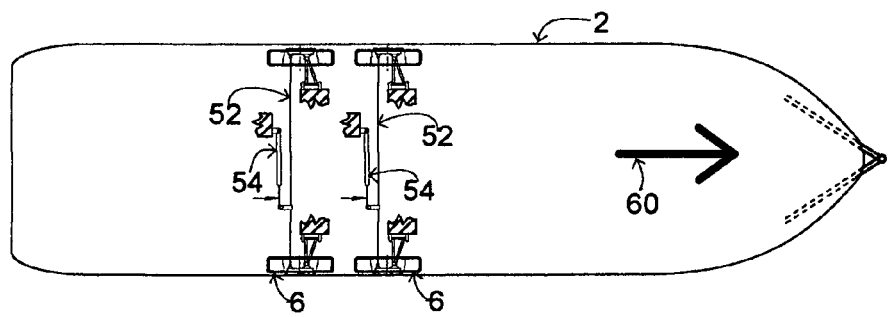
FIG. 38 depicts a cross sectional schematic top view of the Road-Wheel Module system similar to that of FIG. 31 showing two sets of the caster and steering Road-Wheel suspension units.

FIG. 38 depicts a cross sectional schematic top view of the Road-Wheel Module system similar to that of FIG. 31 showing two sets of the caster and steering Road-Wheel suspension units depicted in FIG. 32, illustrating the actuators 54 locked to the tie rods 52, and the Road-Wheels 6 locked in a straight-ahead position. Arrow 60 depicts the forward travel direction of the trailer. The stylized top view schematic of a typical trailer 2 illustrates the front of the trailer at arrow 60. While only two sets of the caster and steering Road-Wheel suspension units are depicted for simplicity, the invention encompasses a lesser or a greater number of caster and steering Road-Wheel suspension unit sets as necessary for the trailer.

Figure 39:
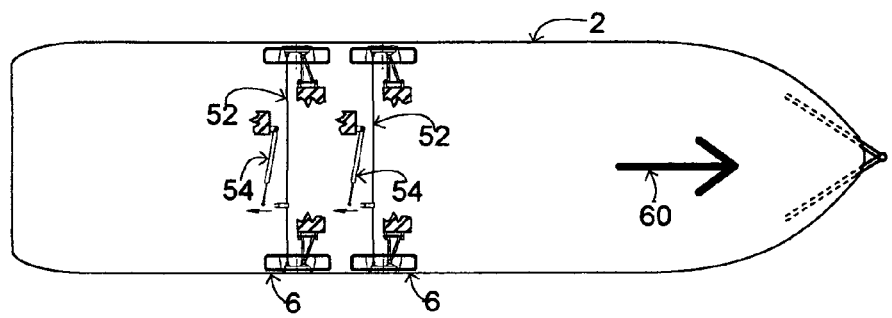
FIG. 39 is the same schematic top view of the trailer shown in FIG. 38, but showing two sets of the caster and steering wheel suspension units.

FIG. 39 is the same schematic top view of the trailer 2 shown in FIG. 38, but showing two sets of the caster and steering wheel suspension units depicted in FIG. 35, which illustrates the actuators 54 unlocked from the tie rods 52 allowing the wheels 6 to freely pivot (caster).

Figure 40:
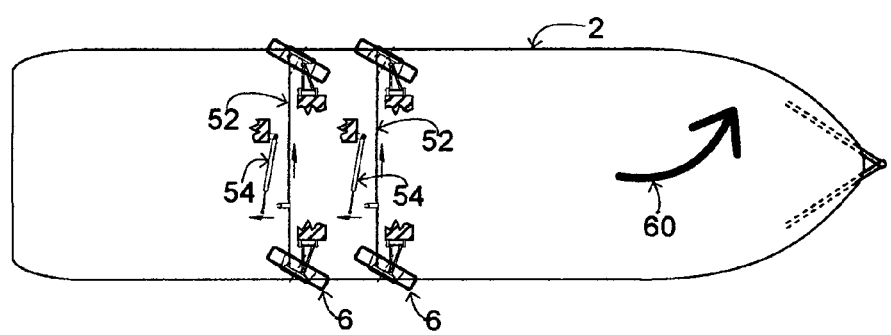
FIG. 40 is the same schematic top view of the trailer shown in FIG. 38, showing the two sets of the caster and steering wheel suspension units pivoting to the right.

FIG. 40 is the same schematic top view of the trailer 2 shown in FIG. 38, showing the two sets of the caster and steering wheel suspension units (commonly referred to as dual or tandem axles) as depicted in FIG. 36 with the actuators 54 unlocked from the tie rods 52, and showing the wheels 6 freely pivoting (castering) to the right following the track of the leftward turning trailer 2. Arrow 60 depicts the leftward forward travel direction of the trailer. Dual, triple, and quad axles on trailers were developed to help spread the vehicle load over the chassis—which they do well, but they cause excessive wear when the trailer makes turns, because the trailer tends to pivot on the tires of the forward axle. This causes a lateral scrub that creates excessive wear, literally "scrubbing" the tread off of the tires on the following axles. In extreme cases, it shears the tire tread completely off causing significant danger. With all the tires automatically pivoting in the track of the turning trailer, tire scrub is substantially eliminated which improves safety while making the tires last longer.

Figure 41:
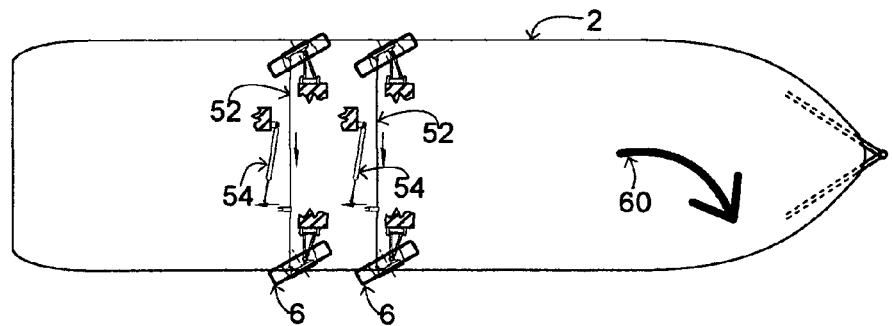
FIG. 41 is the same schematic top view of the trailer shown in FIG. 40, but showing the wheels pivoting to the left.

FIG. 41 is the same schematic top view of the trailer 2 shown in FIG. 40, but showing the wheels 6 freely pivoting (castering) to the left following the track of the rightward turning trailer. Arrow 60 depicts the rightward forward travel direction of the trailer.

Figure 42:
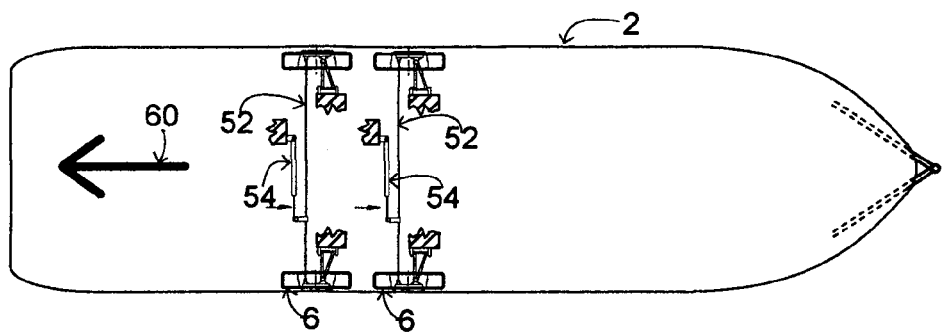
FIG. 42 is the same schematic top view of the trailer as shown in FIG. 38, but showing the trailer backing up in the direction of arrow.

FIG. 42 is the same schematic top view of the trailer 2 as shown in FIG. 38, showing the two sets of the caster and steering wheel suspension units locked in a straight-ahead position (and straight rear position), but showing the trailer backing up in the direction of arrow 60.

Figure 43:
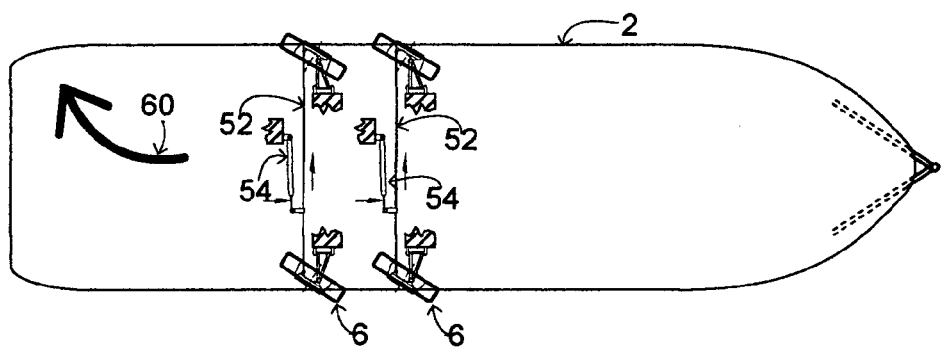
FIG. 43 is the same schematic top view of a trailer as shown in FIG. 42 showing the wheels being steered to the right.

FIG. 43 is the same schematic top view of a trailer 2 as shown in FIG. 42 with the two sets of the caster and steering wheel suspension units locked to the actuators 54, and showing the wheels 6 being steered to the right. Activating the remote electrical actuator direction-control-switch in the tow vehicle causes the actuator 54 to pull the steering tie rod 52 which turns the Road-Wheels 6, causing the trailer to back leftward in the direction of arrow 60. With steerable wheels on the trailer, maneuverability of the backing trailer is greatly enhanced in difficult parking areas.

Figure 44:
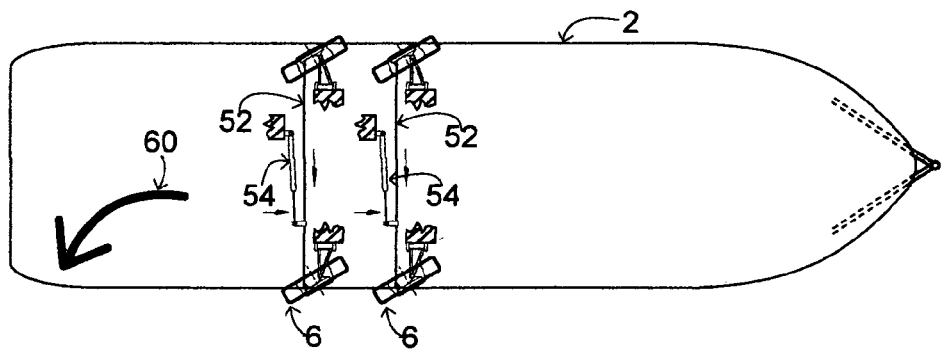
FIG. 44 is the same schematic top view of a trailer as shown in FIG. 42, but showing the wheels being steered to the right.

FIG. 44 is the same schematic top view of a trailer 2 as shown in FIG. 42, but showing the wheels being steered to cause the trailer to back rightward in the direction of arrow 60. While the drawings depict actuators, tie rods, and a latching system to illustrate this embodiment of the invention, any suitable means to allow the wheels to caster and or to steer are intended to be within the scope of this invention.

The present invention has been described in an illustrative manner to assist in understanding some of the embodiments of the invention. It is to be understood that the terminology which has been used is intended to be in the nature of words of description rather than of limitation.

PARENT CASE TEXT

This Hybrid Electric Heavy-Duty Vehicle Drive System patent application is a Continuation-In-Part of my patent application Ser. No. 10/712,227 "Amphibious Recreational Vehicle", which is a Division of application Ser. No. 10/177,314 entitled "Comprehensive Vehicle Construction And Hybrid Electric Drive System" (Ap # 20020153745 of 24 Jun. 2002), which was a Continuation-In-Part of my patent application Ser. No. 09/766,966 (now U.S. Pat. No. 6,425,625)—Rooftop Deck Systems For Vehicles.

And it is related to my Amended Application of 26 Aug. 2003—entitled Recreational Vehicle Full-Length Slideout System (now U.S. Pat. No. 6,679,543) referred to herein, which too was a Division of the original application Ser. No. 10/177,314.

Application Ser. No. 10/177,314—Comprehensive Vehicle Construction And Hybrid Electric Drive System was a CIP of application Ser. No. 10/142,403—Seating, Handrails & Canopy For Rooftop Systems, which relates to my previous U.S. Pat. No. 6,237,988—STREAMLINE ROOFTOP DECK FOR MOTORHOMES.

And, lastly, it is related to my application Ser. No. 10/922,479 of 20 Aug. 2004 entitled THIN-SHELL ULTRALIGHT RECREATIONAL VEHICLE BODY SYSTEM.

I claim:

1. A hybrid semi-trailer truck system comprising:
an electric drive road tractor that incorporates:
a multiplicity of constant-speed internal combustion engines maximized for fuel efficiency, driving a multiplicity of electrical generators or alternators, which automatically start and stop individually and in combinations to meet the varying power demands of the electric drive road tractor, and optionally its semi-trailers;
a driver controlled variable ride-height suspension system that lowers the road tractor suspension to reduce frontal area of the vehicle;
a multiplicity of rooftop photovoltaic modules (solar cell panels) located on the road tractor that are suitably interconnected to augment the varying power demands of the vehicle;
a multiplicity of electric motor-driven road-wheel modules which also act as a generator(s) or alternator(s) to brake the road tractor;
a multiplicity of fuel cell module(s), and or thermal turbine module(s) and or battery module(s), and or capacitor module(s) located in the road tractor which are suitably interconnected to the vehicle system to operate singly or in combinations as required to minimize the number of internal combustion engine(s) running at any one time, while meeting the varying power demands of the vehicle;
and one or more connected semi-trailers which incorporate:
a interconnected variable ride-height suspension system that allows the road tractor driver to lower the trailer(s) suspension to reduce frontal area of the semi-trailer truck system;
a multiplicity of electric motor-driven road-wheel modules which also act as a generator(s) or alternator(s) to brake the semi-trailer(s), that are interconnected to the road tractor's system;
and a multiplicity of rooftop photovoltaic modules (solar cell panels) located on the semi-trailer(s) which are suitably interconnected to augment the varying power demands of the semi-trailer truck system.

2. The hybrid vehicle system as set forth in claim 1, where the semi-trailer incorporates a multiplicity of fuel cell module(s), and or thermal turbine module(s) and or battery module(s), and or capacitor module(s) which are suitably interconnected to the semi-trailer truck system to operate singly or in combinations as required to minimize the number of internal combustion engine(s) running at any one time in the road tractor.

3. The hybrid vehicle system as set forth in claim 1, where the system is suitable for off-road operation.

4. The hybrid vehicle system as set forth in claim 1, where the road tractor is a conventional truck, bus, van, motorhome, SUV, automobile, construction vehicle, tracked vehicle, or an amphibian.

5. The hybrid vehicle system as set forth in claim 1, where the semi-trailer is a recreational travel trailer, a recreational fifth-wheel trailer, a horse trailer, or a tanker trailer.

6. A hybrid semi-trailer truck system comprising:
a road tractor and semi-trailer(s) all having a multiplicity of interconnected electric motor-driven road-wheel modules which also act as a generator(s) or alternator(s) to brake the system;
a multiplicity of constant-speed internal combustion engines maximized for fuel efficiency, driving a multiplicity of electrical generators or alternators, which automatically start and stop individually and in combinations to meet the varying power demands of the electric drive road tractor and its semi-trailers;
a driver controlled variable ride-height suspension system that lowers the road tractor and semi-trailer(s) suspension to reduce frontal area of the system;
a multiplicity of rooftop photovoltaic modules (solar cell panels) located on the semi-trailers that are suitably interconnected to augment the varying power demands of the road tractor;
a multiplicity of fuel cell module(s), and or thermal turbine module(s) and or battery module(s), and or capacitor module(s) located in the road tractor and optionally in the semi-trailer(s) which are suitably interconnected to the system to operate singly or in combinations as required to minimize the number of internal combustion engine(s) running at any one time in the road tractor.

7. The hybrid semi-trailer truck system as set forth in claim 6, where the system is suitable for off-road operation.

8. The hybrid semi-trailer truck system as set forth in claim 6, where the road truck is a conventional truck, bus, van, motorhome, SUV, automobile, construction vehicle, tracked vehicle, or an amphibian.

9. The hybrid vehicle system as set forth in claim 6, where the semi-trailer is a recreational travel trailer, a recreational fifth-wheel trailer, a horse trailer, or a tanker trailer.

* * * * *